Feb. 8, 1944.                I. C. ATCHISON                2,341,417
                         FARM TRACTOR ATTACHMENT
                           Filed Sept. 8, 1941
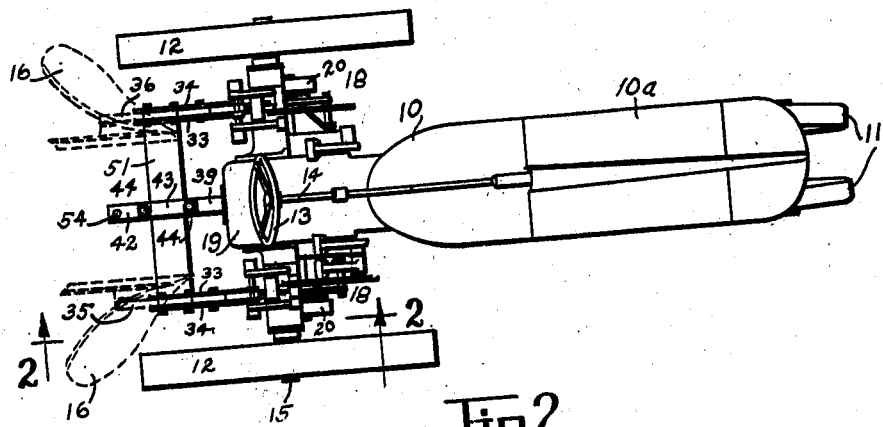
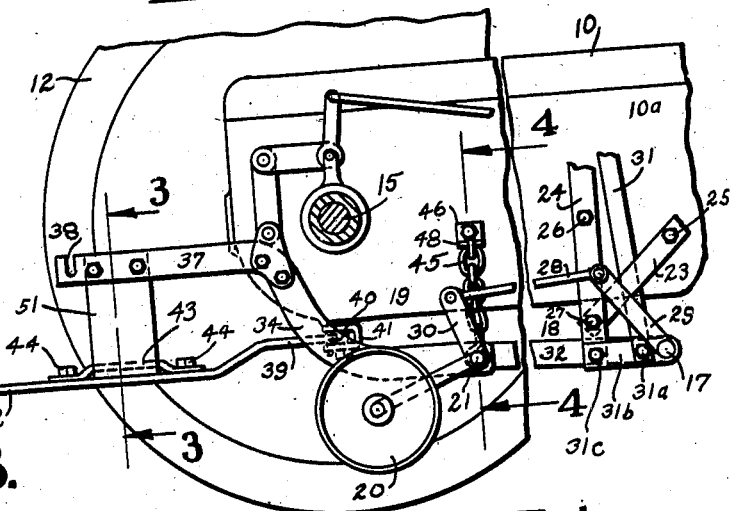
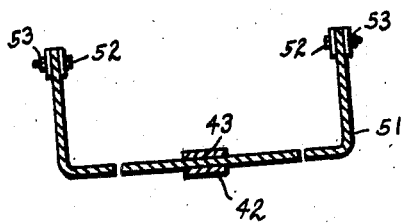
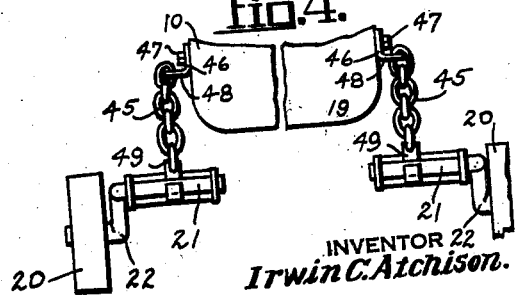
INVENTOR
Irwin C. Atchison.
BY H. G. Manning
ATTORNEY Patented Feb. 8, 1944

2,341,417

UNITED STATES PATENT OFFICE 2,341,417

FARM TRACTOR ATTACHMENT

Irwin C. Atchison, Sherman, Conn.

Application September 8, 1941, Serial No. 409,964

5 Claims. (Cl. 97—47)

This invention relates to farm tractors, and more particularly to means for permitting a rapid changeover of said tractor from plowing to drafting purposes and vice versa.

One object of this invention is to provide an improved detachable U-shaped draft drawbar support which may be quickly and easily connected to the horizontal rear rails of the plow carriage after the removal of the plow bottom and share, and also to provide a chain suspension for each plow carriage guide wheel and its associated parts which are allowed to remain on the tractor during drafting. This support is necessary, because when the plow bottoms are removed and the farmer desires to hitch the tractor to trailing implements for drawing, harrowing, spreading, bushing, seeding, lime sowing, etc., the weight of the plow no longer counterbalances the weight of the guide wheel and its associated carriage rigging which would otherwise be caused to drop downwardly and strike obstructions on the ground.

Another object of this invention is to provide an improved farm tractor attachment of the above nature which will be simple in construction, inexpensive to manufacture, easy to install and manipulate, compact, ornamental in appearance, and very efficient and durable in use.

The main purpose of the present invention is to eliminate the time and labor of disconnecting the plow parts from the plow carriage when changing over from plowing to drawing purposes. Fully a dozen bolts and nuts were formerly required to be removed for the changeover, which was a time-consuming operation, often requiring at least an hour. According to the present invention, all of the plow parts except the plow bottoms are allowed to remain on the tractor during the drafting operation, and, as stated above, a U-shaped draft drawbar support is bolted to the rear side rails of the plow carriage which normally holds said plow bottoms. Each plow guide wheel and the other operating parts of the plow carriage are supported from the casing of the motor by means of an angle block, a chain, and a hook, so as to keep said guide wheel and other plow parts away from the ground and prevent them from striking obstructions. With the present invention, the changeover from plowing to drafting purposes can be made in less than five minutes, and the tractor may be changed back for plowing purposes, whenever desired, in an equally short interval of time.

With these and other objects in view, there have been illustrated on the accompanying drawing, one form in which the invention may be conveniently embodied in practice.

In the drawing:

Figure 1 represents a top plan view of a commercial type of tractor having the invention attached thereto, and showing in dotted lines the original position of the plows which are adapted to be removed and quickly replaced by a U-shaped draft drawbar support when it is desired to use the tractor for drafting purposes.

Figure 2 is a side view on an enlarged scale of the rear portion of the tractor with the right rear wheel removed and the rear axle shown in section along the line 2—2 of Figure 1.

Figure 3 is a transverse vertical sectional view of the U-shaped draft drawbar support taken along the line 3—3 of Figure 2.

Figure 4 is a vertical sectional view taken along the line 4—4 of Figure 2, showing the chains and blocks for detachably holding the plow rigging and carriage guide wheel in raised position on both sides of the tractor when the plows have been removed to permit the use of the tractor for drafting purposes.

Referring now to the drawing, wherein like reference numerals denote corresponding parts throughout the several views, the numeral 10 indicates a tractor upon which is mounted an internal combustion motor 10a. The tractor is supported upon a pair of small front wheels 11 and larger rear traction wheels 12 in the usual manner, and is manually controlled by the driver by a steering wheel 13 mounted upon a steering post 14. The rear wheels 12 are mounted upon a rear axle 15 behind which are located a pair of removable plow bottoms 16, shown in dotted lines in Figure 1, which are operated by means of a transverse plow drawbar 17, forming part of a swinging plow carriage, generally indicated by 18, and which is located below the motor casing 19.

Each plow rigging includes a carriage guide wheel 20 (or "gage wheel") which normally engages the ground during plowing, said wheels 20 being connected to a carriage shaft 21 by a pair of inclined crank arms 22. Each plow carriage is suspended from the casing 19 by a rigid inclined link 23 and a vertical carriage link 24, which links are respectively connected to the casing 19 by bolts 25 and 26. The links 23 and 24 are connected together by a bolt 27, as clearly shown in Figure 2. Provision is also made of a substantially horizontal swinging rod 28 pivotally connected to a pair of upstanding swinging links 29 and 30.

In order to adjust the plow gage wheel 20 during operation, a lever-operated bar 31 is provided, which bar is connected by a bolt 31a to a horizontal link member 31b which is connected by a bolt 31c to the bottom of the link 24. The plow bottoms 16 are supported by a pair of rear carriage frame beams 32 terminating at their rear ends in two pairs of S-shaped inside and outside split rails 33 and 34, which are adapted to embrace the right and left plow stub beams 35 and 36, respectively, shown in dotted lines in Figure 1. The frame beams 32 are not continuous, but consist of fore and aft parts connected by the shafts 21.

The split frame rails 33 and 34 are provided with horizontal rear sections 37 having safety friction release slots 38 formed in the upper portions thereof for receiving friction clips, not shown, which are attached to the plow stub beams 35 and 36.

In using the tractor for drawing trailing implements, provision is made of a swinging draft drawbar 39 pivoted on a vertical bolt 40 mounted on a U-shaped bracket 41 connected to the under part of the casing 19. The draft drawbar 39 is provided with a downwardly offset rear portion 42, upon the top of which is connected a yoke strap 43 as by bolts 44, said strap being adapted to embrace the lower horizontal section of a U-shaped draft drawbar support 51, to be hereafter more fully described.

Changeover

To change the tractor from plowing to drafting, it is only necessary to remove the plow bottoms 16, and in order to prevent the plow guide wheels and the remainder of the plow rigging from dropping to the ground, due to the release of the counterbalancing weight of said plow bottoms, provision is made of a pair of chain members 45 which are connected at their upper ends to a pair of angle blocks 46 secured to the sides of the lower motor casing 19 by bolts 47. The chains are connected at their lower ends to open hook links 49 which embrace the guide wheel carriage shafts 21 so as to keep the plow carriage rigging in raised position and prevent it from striking obstructions on the ground during the operation of the tractor for drafting purposes. The angle blocks 46 are provided with horizontal eye members 48 for receiving the upper links of the chain (see Figures 2 and 4).

When the plow bottoms 16 have been removed from the rails 33 and 34 of the rear beams 32, the U-shaped draft drawbar support 51 will have its vertical arms inserted between said rails and detachably held securely in position by bolts 52 and nuts 53—it being understood, of course, that the bottom portion of the U-shaped support 51 has been previously passed between the yoke strap 43 and the rear portion of the drawbar 42. The draft drawbar is provided with an eye 54 at the rear portion thereof for hitching to any trailing implement which it is desired to employ.

Operation

In operation, when it is desired to changeover the tractor from plowing to drawing purposes, it will merely be necessary to disconnect the plow members 16 from the frame rails 33 and 34, and replace them with the U-shaped draft drawbar support 51, an operation requiring not more than five minutes of time.

The plow guide wheel and carriage parts are not removed from the tractor but are allowed to remain in their original condition except that they are supported in raised position by hooking the open bottom links 49 of the chains 45 underneath the guide wheel carriage shafts 21. The tractor is then in condition to be used for drafting purposes. As will be understood, the operation of changing back to plowing purposes is just the reverse of that described above.

While there have been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a hitch for permitting a farm tractor to be interchangeably used for plowing and dragging trailing implements, a frame for attachment to the tractor chassis, said frame having two pairs of split beam rails at the rear end thereof, a pair of removable plow bottoms having stub beams adapted to be detachably secured within said split rails, swinging plow carriages connected to each of said rails, a plow drawbar operatively connected to said rails, means for supporting said plow carriages to prevent them from dropping down to the ground when said plow bottoms have been removed to changeover the tractor for drafting purposes, a draft drawbar and means detachably connected to said split rails for supporting said draft drawbar during drafting.

2. In a draft rigging for a tractor having a pair of side rails, a frame for connection to the chassis of said tractor and having a pair of split beam rails at the rear end thereof, a draft drawbar connected to said tractor, and a U-shaped support for said drawbar having its vertical legs connected to said split rails and its horizontal bottom portion supporting said draft drawbar, said drawbar support being readily removable from said tractor to permit a pair of plow bottoms to be detachably secured within said rails, in place thereof.

3. The invention as defined in claim 2 characterized by having a swinging plow carriage rigging connected to said split rails, and means for suspending said rigging from said tractor away from the ground to prevent it from striking the ground when the counterbalancing weight of said plow bottom is removed from the rear of said plow rigging.

4. In a draft rigging for a tractor having a swinging plow carriage rigging pivotally connected therewith, means for supporting said plow carriage from said tractor and preventing it from dropping to the ground when the plow bottom is removed from the rear of said carriage due to the release of the counterbalancing weight of said plowshare, whereby said tractor may be used for drawing trailing implements, said plow carriage supporting means comprising a bracket secured to the bottom of the motor casing, a chain connected to said bracket, an open bottom hook link connected to said chain for embracing the shaft of said plow carriage, a draft drawbar, and means for supporting said draft drawbar during drafting.

5. The invention as defined in claim 4 in which said bracket comprises an angle block, a bolt for securing said angle block to said casing, and said angle block having a horizontal eye for attachment to the upper link of said chain.

IRWIN C. ATCHISON.